United States Patent [19]
Sulzberger

[11] 3,934,551
[45] Jan. 27, 1976

[54] MILKING SYSTEM

[76] Inventor: Kevin John Sulzberger, 43 R.D., Waitara, Taranaki, New Zealand

[22] Filed: Sept. 9, 1974

[21] Appl. No.: 504,650

[52] U.S. Cl. .............................................. 119/14.04
[51] Int. Cl.² ............................................ A01J 5/00
[58] Field of Search .................................. 119/14.04

[56] References Cited
UNITED STATES PATENTS

| | | | |
|---|---|---|---|
| 1,787,152 | 12/1930 | Hapgood.......................... | 119/14.04 |
| 1,968,564 | 7/1934 | Luks................................. | 119/14.04 |
| 1,987,955 | 1/1935 | Hapgood.......................... | 119/14.04 |

*Primary Examiner*—Hugh R. Chamblee
*Attorney, Agent, or Firm*—Ladas, Parry, Von Gehr, Goldsmith & Deschamps

[57] ABSTRACT

A milking system for cows which includes an intermittently substantially annular platform onto which cows may walk over an outer periphery into a milking station and from which a cow may depart by a descending chute over an inner periphery of said platform. The platform is intermittently rotated in use by a novel rope drive with automatic movements occuring after a preselected period which allows at least a minimum period of time for a cow to enter onto or depart from the platform. Automatic means are provided to detect when a cow is likely to cause an obstruction to the movement of said platform. When such an obstruction is detected the automatic advancement of the platform is delayed until such time as the obstruction ceases.

12 Claims, 5 Drawing Figures

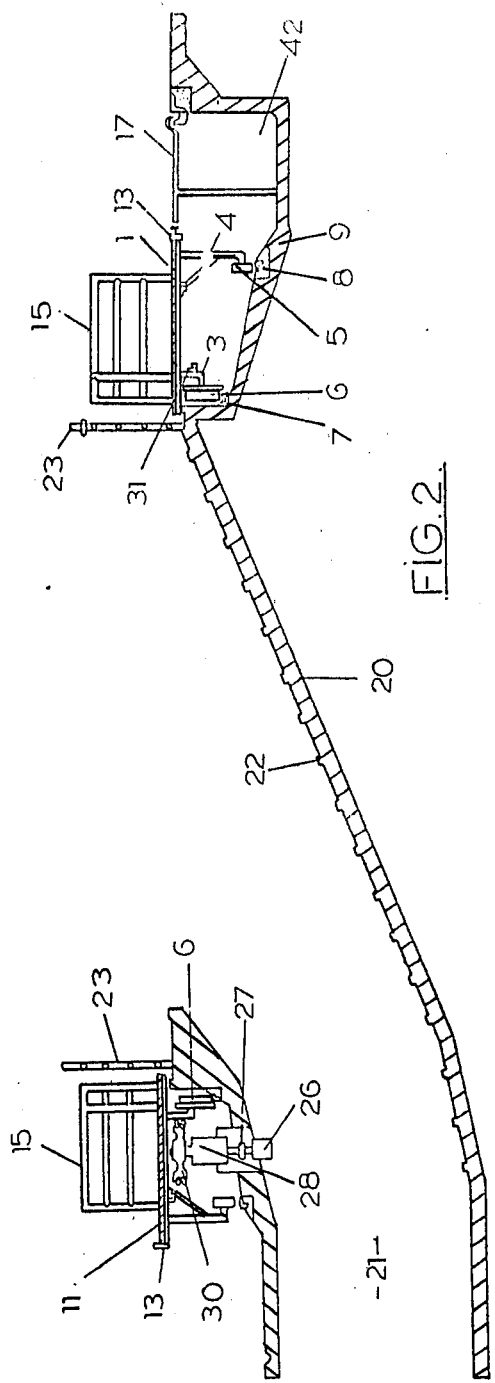

MILKING SYSTEM

BACKGROUND OF THE INVENTION

1. Field of the Invention

This invention relates to a substantially annular platform for milking cows, which is intermittently moveable in order to advance various milking stations around the rotational axis of said platform, there being controls to automatically advance said platform as desired but to prevent advancement thereof where an obstructing cow is likely to injure itself or prevent the easy advancement of the platform.

2. Description of the prior art

U.S. Pat. No. 1,968,564 to Kramer Luks discloses the use of a substantially annular milking platform which is rotatable so as to bring milking stations containing a milked cow into alignment with an egressing ramp which extends downwardly from the inner periphery of said annular platform. The same movement brings a vacant milking station into alignment with an access way whereby a cow to be milked may move forwardly into said milking station by passing over the outer periphery of said platform. U.S. Pat. No. 1,968,564 also discloses the use of various automated servicing stations such as washing, stimulating and drying stations disposed about the rotational axis of said rotatable platform whereby the outwardly facing rear end of a cow may be acted upon in order to minimise the number of operators.

More recently automatic cup detachers and the like have been used in order to minimise still further the number of operators who are disposed about the outer periphery of such a platform on depressed walkways.

British Patent specification No. 1,115,895 discloses the use of a substantially annular platform in conjunction with various cow detection means disposed about the outer periphery thereof. Such detection apparatus is used to vary the speed of rotation of a motor and hence the platform. The preferred detection apparatus includes the use of a photo-electric system which is arranged to alter the speed of the motor only after a cow or person has operated the photo-electric system for a predetermined period of time.

SUMMARY OF THE INVENTION

The present invention is adapted to make the intermittent movements of a rotatable substantially annular platform of the type herein defined where a cow walks on over the outer periphery and descends over the inner periphery occur as soon as possible without however, causing unnecessary harm to cows which may be only partially over said platform.

Accordingly in one aspect the present invention comprises: in a milking system for cows which includes a rotatable substantially annular platform having means for locating cows at various milking stations thereon, means for intermittently rotating and thus advancing sequentially said milking stations on said platform to various positions disposed around the rotational axis of said platform, access means for a cow to be milked to enter onto said platform into a milking station at a certain rotational position while said platform is stationary, any such access being over the outer periphery of said substantial annular platform, and egressing means for allowing a cow that has been through a milking cycle to depart from said platform while stationary by passing over the inner periphery of said substantial annular platform from whence it may subsequently pass under a portion of said platform, The combination with said system of:

a. means for automatically advancing said rotatable platform from a first stationary position to a second stationary position with the result that milking stations are moved to a position occupied previously by a neighbouring milking station, said automatic advancement occuring after the elapsing of a predetermined base period which has been preselected to allow at least a minimum period of time for an unmilked cow and a milked cow to enter onto and to depart from said platform respectively, b. means for automatically detecting when a cow over said platform is causing an obstruction to rotation of said platform by spanning a periphery thereof and, c. means actuable at the control of the means for automatically detecting obstructions capable of over-riding said means for automatically advancing said platform when an obstruction is detected with the result that if after the elapsing of said base period an obstruction is detected, no automatic rotation of the platform will occur until such time as said means for automatically detecting an obstruction no longer detects and obstructing cow whereupon said platform is automatically advanceable immediately by said means for automatically advancing.

In a further aspect the present invention comprises, means for automatically advancing intermittently a rotatable substantially annular milking platform having a plurality of milking stations thereon, said means comprising:

guide means, which include a plurality of guiding members mounted underneath said substantially annular platform in a manner such that they are disposed substantially concentrically about the rotational axis of said platform, an endless driving rope frictionally engaged with said guide means, a capstan actuable to drive said endless driving rope thereby in turn causing the substantially annular platform to rotate by virtue of the frictional engagement between said rope and said guide means, and means to actuate said capstan, said means including a timing mechanism which automatically prevents the actuation of said capstan until after the elapsing of a predetermined base period, and, means for automatically detecting an obstruction likely to prevent the easy rotation of said platform and preventing the actuation of said means for automatically advancing said platform until such time as said obstruction is no longer likely to prevent the easy rotation of said platform.

In yet a further aspect the present invention comprises, a method of controlling the entrance and departure of cows on to an intermittently rotatable substantially annular milking platform which has means for admitting a cow over the outer periphery of said substantially annular platform while said platform is stationary and means to allow the exit of a milked cow over the inner periphery of said platform whilst the platform is stationary from whence the cow may then pass underneath a portion of said platform, said method including the steps of a. providing an automatic advancing control for said rotatable platform so that said rotatable platform is moved from a first stationary position to a second stationary position after the elapsing of a preselected base period which gives at least a minimum period of time sufficient for a cow to clear either periphery of said platform, b. providing means for automatically detecting when a cow over said platform is causing an obstruction to rotation of said platform by spanning a periphery thereof and, c. providing an automatic over-riding control actuable by said means for automatically detecting an obstructing cow which will prevent the automatic advancement of said platform until such time as such an obstruction to rotation of said platform ceases whereupon immediately movement of said platform occurs.

BRIEF DESCRIPTION OF THE DRAWINGS

The preferred embodiments of the present invention are shown in the accompanying drawings in which:

FIG. 2 is a partly diagrammatic sectional view through A—A of FIG. 1.

DESCRIPTION OF THE PREFERRED EMBODIMENTS

Figure 1:
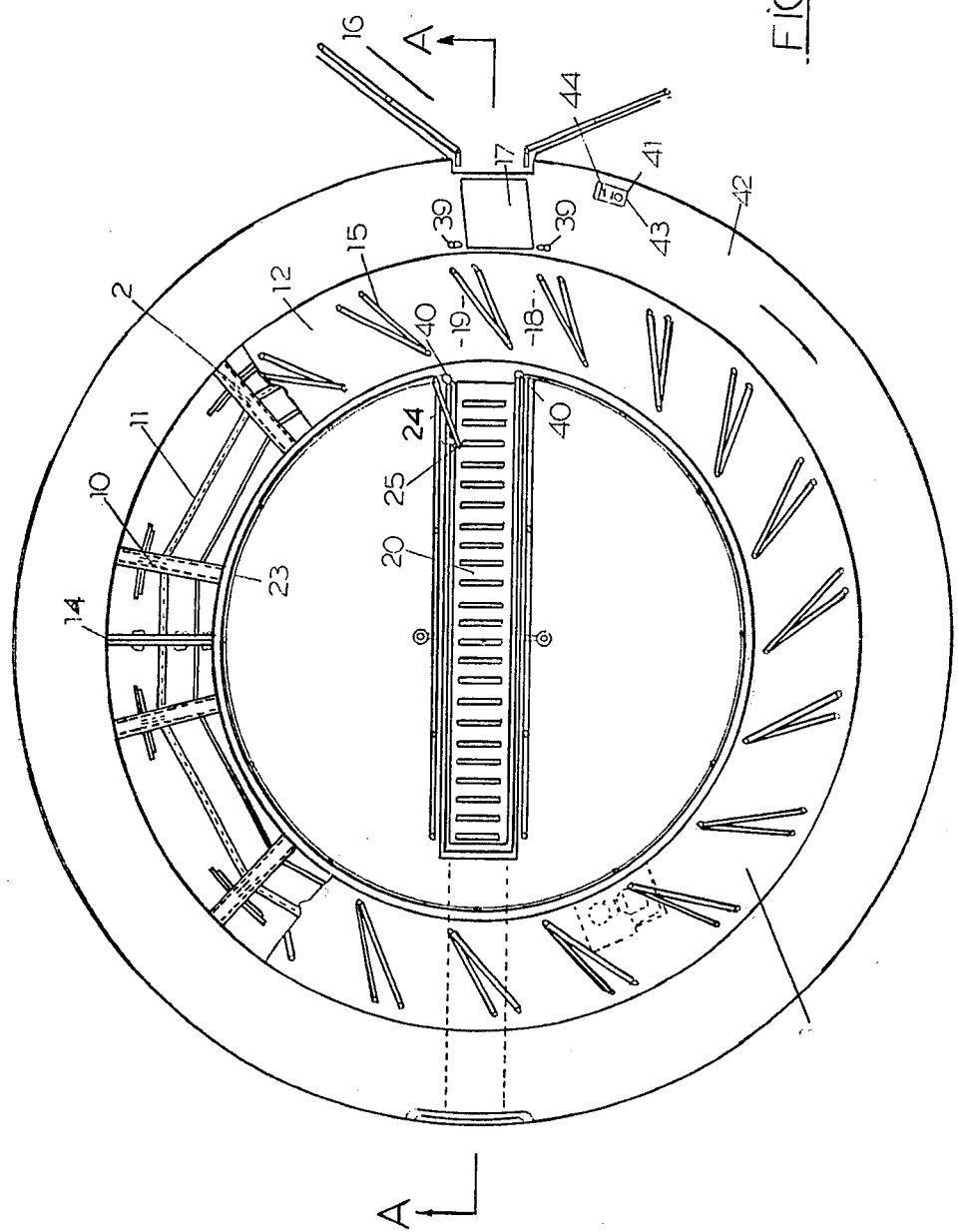
FIG. 1 is a plan view of apparatus used in a milking system according to the present invention.

In the preferred form of the present invention a substantially annular rotatable platform 1 in which cows are to be moved during milking is supported upon a structural framework 2 shown in more detail in FIG. 1. This structural framework includes a plurality of legs 3 and 4 with supporting wheels 5 and 6 attached which engage upon two circular rails 7 and 8 embedded in a suitable concrete foundation 9, said circular rails being substantially concentric with the axis of rotation of said platform. The rails 7 and 8 are preferably angle iron members embedded in a concrete foundation and accurately set in place so that the rails are horizontal with the minimum of variation from the horizontal plane.

Locating means are provided between one set of wheels and the associated rail. As illustrated in the drawings the wheel 6 is flanged and the angle iron 7 includes two bearing faces to thereby locate the platform. Such a means of location is preferable bearing in mind the practicable impossibility of locating said platform at a central pivot point owing to the fact that the egressing means comprises a downwardly descending ramp from the inner periphery of the substantially annular platform.

The structural form of the platform can be varied but it has been found that a particularly suitable form is provided by channel iron transverse members 10 shown in a partially cut away portion of the platform illustrated in FIG. 1. These transverse members 10 are connected to a substantially circumferential angle iron member 11 substantially towards the mid-point of the channel members. Checker plate decking 12 is provided thereon having a peripheral strengthening band 13. Such a construction allows for the wheels carried by the transverse members 10 to bear upon the rail evenly and results in the minimum distortion during construction which has considerable economic advantages.

Also the platform may be constructed in four equal sections with the quadrants being joined at 14 to thereby allow the platform to be moved into a prepared site easily and quickly.

Mounted on the deck 12 of the platform are the various members adapted to locate a cow or cows at a milking station. The embodiment shown in FIG. 1 includes bail forming members 15 which are inclined in the direction of rotation slightly, but are generally radially arranged so that cows will be standing radially facing inwards when positioned on a platform. It should be realized however that in other forms of the present invention each milking station may include more than a single set of cups, i.e. with a large diameter annular platform, two or more cows may enter onto or depart from said platform at any one stationary position.

The platform is associated with the loading yard 16 which may include any convenient means of ensuring the cows are presented to move across the ramp 17 and into the available stall 18, during the particular sequence of operation of the machine. During the same operation, the cow which has previously been milked and is in stall 19 is ready for discharge down the ramp.

It has been found particularly convenient to discharge the animal down the ramp 20 as shown in FIG. 2 which passes downwards from the inner periphery of the platform down through the centre of rotation of the platform and via a tunnel 21 passes under the opposite side of the platform to a discharge point, e.g. up a ramp and into a discharge yard or the like. It should be realized however that the ramp 20 could be returned backwards towards the direction of the axis ramp 17. The ramp 20 includes gripping ribs 22 to ensure each animal has an adequate grip when moving from the platform.

A circular barrier 23 provides the front which completes the bail spaces until the cow in the bail 19 is ready to move down the egress ramp 20. It is possible an operator may wish to move a cow past the egress ramp for example, if a cow is a particularly slow milker. In such an instance it may be convenient to provide gates such as at 24 provided with a mechanical control, for example a hydraulic or pneumatic cylinder 25 so that the gate can be closed upon an appropriate control switch being operated to ensure the animal will be moved past the egress ramp. Alternatively the operator could use some over-riding control to prevent the stopping of that particular stall in correspondence with the egress ram 20. However in such a case it would not be possible to load up a vacated milking station.

Figure 3:
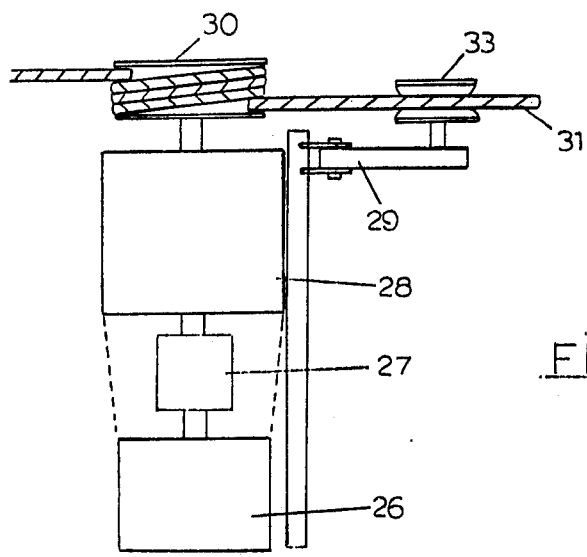
FIG. 3 is a side elevation view of a capstan used for driving an endless driving rope in accordance with the present invention.
Figure 5:
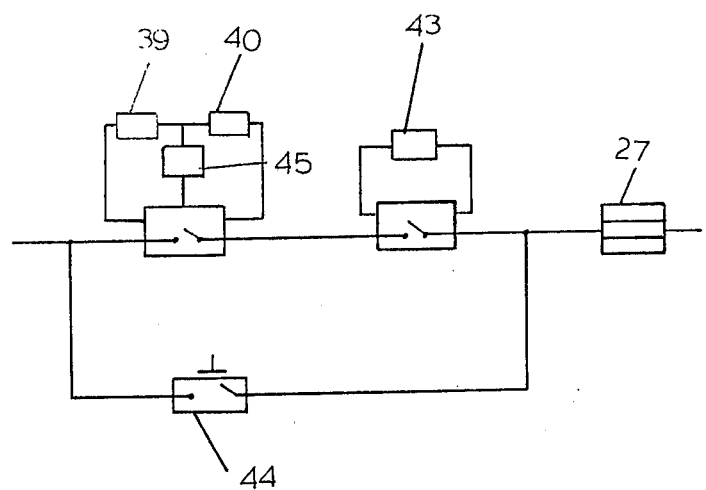
FIG. 5 shows a schematic arrangement of a suitable control circuit for use in the present invention.

FIG. 3 shows a preferred form of drive for a platform in accordance with the present invention. This drive includes an electric motor 26 connected through an electro-magnetic clutch 27 to a transmission unit or gear box 28 which in turn is connected to a capstan 30 about which a drive rope 31 is passed. The type of preferred drive is shown in more detail in FIG. 4 which is a gross over-simplification but which clearly shows and assists in an explanation of how the driving mechanism works.

Located on one side and preferably underneath said annular platform or in close proximity thereto is said driving capstan 30 about which the rope 31 is wound perhaps up to 5 times. In the preferred form of the present invention a milking platform capable of up to 28 cow units uses a 13 millimetre wire rope prestretched to 6,000 lbs. Larger sheds will use a 16 millimetre steel cord wire rope which has been prestretched to 11,000 lbs approximately. It should be realized however that other types of rope may be employed. Also it should be realized that a person skilled in the art will readily visualize that a flexible belt or the like could be used instead of a wire rope. It is most desirable however for reliability to use any such rope or belt after it has been prestretched in accordance with the manufacturer's ratings. The diameter of the driving capstan 30 will depend upon the manufacturer's rating for the wire rope with which the capstan is to be employed in use. A person skilled in the art however, would have little difficulty in deciding upon a suitable diameter bearing in mind the ratings of the motor 26 and the gear box or the like 28 and also the relative diameter of the capstan 30 to the guides attached underneath the annular platform.

Figure 4:
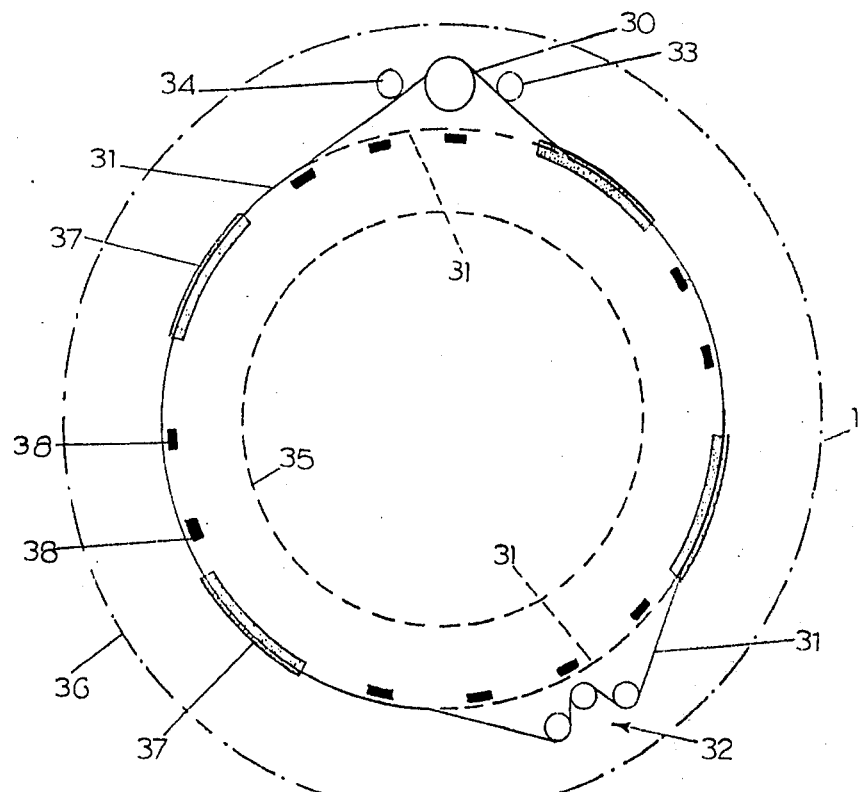
FIG. 4 is a diagrammatic plan view showing the manner in which such an endless driving rope is used.

The wire rope passes from said capstan 30 around the guide means. In a smaller rotatable platform the rope 31 will be passed around the capstan up to about 5 times and around the guide means 3 times. The path shown in FIG. 4 shows the rope passed around the guide means once. It should be realized however that any additional circuits of said rope around said guide means would not need to pass around the capstan 30 or through the rope tensioning means 32 associated with the rope adjacent said guide means. FIG. 4 shows the path of such windings that do not go to the capstan or the tensioning means 32 as a dotted line marked 31 with a dotted connecting line. The drive mechanism as previously described depends upon frictional contact between guide means and the rope 31. For this reason it is essential that the rope be kept under the required tension to ensure the maximum frictional contact. To this end, output and input tensioning means are associated with said driving capstan 30. In the preferred form of the present invention automatic tensioners 33 and 34 are mounted pivotally from the mounting of said capstan or some other member associated therewith and are each biassed so as to bear against the rope 31 as it passes nearby. The automatic tensioning means incorporates sheave members to bear against the rope. The required tension is obtained by employing a spring member or other suitable biassing means having the desired rating, for example a spring of 150 foot pounds force. It is not essential in understanding the present invention to fully describe how such automatic tensioning means are constructed, however a perusal of FIG. 3 shows the output sheave mounted on a channel member 29 pivotted at that end remote from said sheave to a mounting of said capstan 30. A spring mechanism (not shown) would then bear at an angle against the pivotted member in order to force said sheave against said rope 31 as required. The arrangement of the other automatic tensioning means viz. 34 would be somewhat similar.

The tensioning means 32 comprises a plurality of sheaves mounted on a base plate or the like. These members would be adjustable in order to take up any slack in the rope 31. The tensioning shown in FIG. 4 could be improved upon in order to enhance the rope life, i.e. the tensioning throughout could be arranged so that the rope is always twisted in a single direction.

The guide means shown in FIG. 4 is located between the inner periphery 35 and the outer periphery 36 of the platform, and preferably comprises guiding channel member 37 in addition to guiding blocks 38. A person skilled in the art would readily visualize how the various arrangements would be set out in order to ensure the best use of the apparatus. The channel members 37 are preferably disposed intermittently around said annular platform so that a substantially constant amount of contact between said rope 31 and a said channel member 37 occurs, no matter at what stage said platform has reached during its rotation.

Various safety mechanisms will be provided, i.e. the clutch 27 could be used as a brake having various controls associated therewith which will be described in more detail later.

It is interesting to note that a great deal of torque is necessary to initiate the starting up of each intermittent movement of a platform of the type hereindescribed. This torque loading is the starting torque which recurs frequently during a milking period. For an 18 to 20 cow unit the torque loading is approximately 448 foot lbs force, while for a 28 cow unit and for a 50 cow unit the torque loading is increased to 780 and 1100 foot lbs force respectively. These loadings clearly indicate the tensions and the like and the strength for various materials that would be necessary to ensure the reliability of operation which is a prime requirement bearing in mind the fact that if one milking is missed, milk production for the whole year may be decreased by 5 percent or a figure of that significance.

Already, it has been found that the use of an annular milking platform whereby cows move forwardly onto and forwardly off the platform is far faster than having to train cows to back out or move sideways off a platform. A suitable platform which embodies this advantage has been described. However, it will be clear that some controls must be provided whereby the intermittent movement of the rotatable platform is controlled so that no cow is crushed between for example a bail defining member 15 and an edge of the inner peripheral barrier 23. This feature of the present invention will now be described. It is fitting to note at this point that the intermittent nature of the movement of the preferred form of the present invention enhances the milk flow as the cows have been found to be more relaxed bearing in mind the movement that occurs on such an intermittent platform. Also, the use of an intermittent platform whereby the platform is stationary when a cow is to make a movement on or off the platform indicates to the cow when a movement should be initiated. This leads to marked increases in the rates at which movements occur on or off the platform over comparitive continuously moving platform. However, there is a tendency where an intermittently moving platform is used to set the period between movements sufficiently long to enable almost all cows to move. For this reason, the present invention has been devised so that a minimum period or the like can be provided to enable a cow to move with a safeguard such that if complete movement has not occurred the platform will not move until such a time as the cow is no longer obstructing the easy movement of the platform. The present invention preferably makes no allowance for a cow that does not wish to leave the platform. Where such a cow repeatedly refuses to leave the platform when it has had several opportunities to do so an operator could use an over-riding control and manually force the cow from the platform. However, in use it is found that cows are generally willing to co-operate after an initial training period.

The present invention has a photo-electric sensing device located parallel or substantially parallel to the inner periphery 35 at the top of the egress ramp 20 and another substantially parallel to the outer periphery 36 in the access way 17. Such photo-electric sensing mechanisms or alternatively pressure sensitive foot plates or the like would determine when the cow is spanning a periphery of said platform and is likely to cause an obstruction to the easy movement of the platform. Depending upon the various members that are disposed about and on the platform the sensing mechanisms could be varied in order to ensure the best use thereof.

In the preferred form the clutch 27 would be manipulated by various control signals. The control signals would be dependent upon a timing circuit which intermittently moves said platform 1. Movements between milking stations would occur at a constant rate because the motor 26 is operating at a constant speed in the preferred form of the invention. These actuating signals can be of two types, (1) a signal from the timer circuit or the like after the elapsing of a minimum base period sufficient to provide at least a minimum period of time for a cow to move on to or move off the platform and, (2) a signal from an over-riding circuit actuable by said sensing mechanism which prevents the movement of said platform after the elapsing of said base period until such time as a cow obstructing the easy movement of said platform is no longer causing an obstruction whereupon immediate movement occurs.

FIG. 1 shows photo-electric sensors 39 guarding the entrance to a milking station and photo-electric sensors 40 guarding the exit from milking station 19. A control panel 41 is positioned in a walkway 42 surrounding the rotary platform at a convenient position for the operator. The control panel includes a variable timer unit 43 and a push button 44 for manual operation. A mechanical operated de-activating switch 45 actuated by movement of the platform is preferably incorporated to ensure the photo-electric elements 39 and 40 cannot interrupt the drive cycle once it is initiated.

Using a control means according to the present invention, it is possible for the operator to vary the base delay period in the cycle of operations by adjusting control knob 43. For example the platform may be stopped for a base period of 6 to 7 seconds or up to a time of half a minute or more. For normal operation the delay would be varied between 7 and 15 seconds. The actual drive time during which the platform is moved one milking station space would again depend to some extent on the drive means used but would ordinarily be between 5 and 7 seconds, and this drive time would not be varied whenever the base time is varied. By using this control the operator can select the speed of operation most convenient at the particular time. For example two operators may be available for a period and accordingly the rate of operation can then be considerably increased. Similarly for any reason should one of a plurality of operators have to leave the rate of operation can be reduced accordingly to allow the remaining operator or operators to cope during that period.

The rate selected can reduce the time delay to an absolute minimum because of the control circuit of the present invention. The sensors 40 and 39 guarding the exit and entrance respectively allow the time which the platform is at rest to be varied beyond the base time period delay selected, depending upon the time taken for the cows to change, but for an absolute minimum time outside the base period. Hence for example, if a base period of 8 seconds was selected, at the end of that time the timer unit would cause the switch actuated thereby to close and provided there was no obstruction in the sensors 39 and 40 the clutch 27 would operate. Should however the sensors detect an obstruction in either of the sensors operation would be held up until the obstruction was cleared at which stage the clutch would immediately be engaged and the drive commence.

In this way the speed of the operation of the platform is increased and an 18 cow platform has a capacity considerably above that of a platform having a comparable size without the control mechanism. Also the means of drive and the means by which the animal is discharged from the platform ensures a considerable saving of time.

No mention will be made herein of how various mechanical servicing appliances could be disposed about the annular platform for example, udder cleaners, stimulators and dryer, cup attaching devices and cup detaching devices.

Only the preferred rope drive has been disclosed. It should be realized however that many other types of intermittent movement drives could be used. For example, pneumatic or hydraulic rams which actuate the various detents or the like in said platform, or for example a series of actuable drive wheels, cogs or the like could be used. The use of the rope and capstan however allows the platform to be reversed as a manual reversing switch can be engaged which will cause the cow loaded on a stall 18 to be reversed so that it is ready to be discharged down the ramp 20, if for any reason there are dry cows which are not to be milked with the herd.

A person skilled in the art will readily visualize the many different types of circuitry or the like that could be used in order to provide an annular platform embodying the spirit of the present invention. It should be noted however, that a milking system in accordance with the present invention provides one of the most efficient milking systems available bearing in mind the number of cups and operators to be used with a particular number of cows.

What I claim is:

1. In a milking system for cows which includes a rotatable substantially annular platform having means for locating cows at various milking stations thereon, means for intermittently rotating and thus advancing sequentially said milking stations on said platform to various positions disposed around the rotational axis of said platform, access means for a cow to be milked to enter onto said platform into a milking station at a certain rotational position while said platform is stationary any such access being over the outer periphery of said substantial annular platform, and egressing means for allowing a cow that has been through a milking cycle to depart from said platform while stationary by passing over the inner periphery of said substantial annular platform from whence is may subsequently pass under a portion of said platform, the combination with said system of:

a. means for automatically advancing said rotatable platform from a first stationary position to a second stationary position with the result that milking stations are moved to a position occupied previously by a neighbouring milking station, said automatic advancement occuring after the elapsing of a predetermined base period which has been preselected to allow at least a minimum period of time for an unmilked cow and a milked cow to enter onto and to depart from said platform respectively, b. means for automatically detecting when a cow over said platform is causing an obstruction to rotation of said platform by spanning a periphery thereof and, c. means actuable at the control of the means for automatically detecting obstructions capable of over-riding said means for automatically advancing said platform when an obstruction is detected with the result that if after the elasping of said base period an obstruction is detected, no automatic rotation of the platform will occur until such time as said means for automatically detecting an obstruction no longer detects an obstructing cow whereupon said platform is automatically advanceable immediately by said means for automatically advancing.

2. A combination of claim 1 wherein each said milking station has a single set of cups and is adapted to contain one cow only.

3. A combination of claim 1 wherein each said milking station includes a plurality of cups and is adapted to locate on said platform a plurality of cows corresponding to the number of sets of cups.

4. A combination as claimed in claim 1 wherein said means for automatically detecting when a cow over the platform is causing an obstruction to rotation of said platform by spanning a periphery thereof, includes a photo electric sensing mechanism interruptible operatively by a cow causing such an obstruction.

5. A combination of claim 1 wherein manual over-riding controls are provided capable of instantaneously starting and stopping the rotation of said platform.

6. A combination of claim 1 wherein a cow when located for milking in a milking station has its rear facing outwardly from the rotational axis of said rotatable platform.

7. A combination as claimed in claim 1 wherein said substantially annular platform is rotatably located using a plurality of flanged wheels which engage with a circular rail which is located underneath said platform.

8. A combination of claim 1 wherein said means actuable at the control of the means for automatically detecting obstructions includes an electronic circuit having the required switching characteristics.

9. A combination of claim 1 wherein said means for intermittently rotating said substantially annular platform includes an endless driving rope which is frictionally engageable with guides located underneath the said substantially annular platform which are substantially concentric with the rotational axis thereof.

10. A combination of claim 1 wherein said predetermined base period may be adjusted manually by an operator without affecting the rate at which said rotatable platform is rotated between said first and second stationary positions.

11. Means for automatically advancing intermittently a rotatable substantially annular milking platform having a plurality of milking stations thereon, said means comprising:

guide means, which include a plurality of guiding members mounted underneath said substantially annular platform in a manner such that they are disposed substantially concentrically about the rotational axis of said platform, an endless driving rope frictionally engaged with said guide means, a capstan actuable to drive said endless driving rope thereby in turn causing the substantially annular platform to rotate by virtue of the frictional engagement between said rope and said guide means, and means to actuate said capstan, said means including a timing mechanism which automatically prevents the actuation of said capstan until after the elapsing of a predetermined base period, and, means for automatically detecting an obstruction likely to prevent the easy rotation of said platform and preventing the actuation of said means for automatically advancing said platform until such time as said obstruction is no longer likely to prevent the easy rotation of said platform.

12. A method of controlling the entrance and departure of cows on to an intermittently rotatable substantially annular milking platform which has means for admitting a cow over the outer periphery of said substantially annular platform while said platform is stationary and means to allow the exit of a milked cow over the inner periphery of said platform whilst the platform is stationary from whence the cow may then pass underneath a portion of said platform, said method including the steps of;

a. providing an automatic advancing control for said rotatable platform so that said rotatable platform is moved from a first stationary position to a second stationary position after the elapsing of a preselected base period which gives at least a minimum period of time sufficient for a cow to clear either periphery of said platform, b. providing means for automatically detecting when a cow over said platform is causing an obstruction to rotation of said platform by spanning a periphery thereof and, c. providing an automatic over-riding control actuable by said means for automatically detecting an obstructing cow which will prevent the automatic advancement of said platform until such time as such an obstruction to rotation of said platform ceases whereupon immediately movement of said platform occurs.

* * * * *